(12) United States Patent
Ramasubramanian et al.

(10) Patent No.: US 7,133,474 B2
(45) Date of Patent: Nov. 7, 2006

(54) METHOD AND SYSTEM FOR TIMING RECOVERY AND DELAY SPREAD ESTIMATION IN A COMMUNICATION SYSTEM

(75) Inventors: Karthik Ramasubramanian, Sunnyvale, CA (US); Kevin Lynn Baum, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 612 days.

(21) Appl. No.: 09/919,050

(22) Filed: Jul. 31, 2001

(65) Prior Publication Data

US 2003/0026360 A1 Feb. 6, 2003

Related U.S. Application Data

(60) Provisional application No. 60/414,527, filed on Dec. 29, 2000.

(51) Int. Cl.
*H04L 27/06* (2006.01)
*H04L 27/28* (2006.01)

(52) U.S. Cl. ...................... 375/343; 375/260

(58) Field of Classification Search .............. 375/343, 375/346, 347, 348, 349, 224, 299, 285, 350, 375/354, 355, 150, 152, 260, 326, 327; 370/206, 370/208
See application file for complete search history.

(56) References Cited

U.S. PATENT DOCUMENTS 5,732,113 A 3/1998 Schmidl et al.
6,205,188 B1 3/2001 Stott et al.
6,219,334 B1* 4/2001 Sato et al. .................. 370/210
6,658,063 B1* 12/2003 Mizoguchi et al. ......... 375/260
6,711,123 B1* 3/2004 Taira ........................ 370/208
2002/0196731 A1* 12/2002 Laroia et al. .............. 370/206
2004/0190638 A1* 9/2004 Blasco Claret et al. ..... 375/260

FOREIGN PATENT DOCUMENTS

EP 1 065 855 A1 * 1/2001

OTHER PUBLICATIONS

Jan-Jaap van de Baek et al., "ML ESTIMATIONn of Time and Frequency Offset in OFDM Systems", IEEE Transactions on Signal Processing, vol. 45, No. 7, Jul. 1997, pp. 1800-1805.
T.M. Schmidl et al., "Low-Overhear, Low Complexity [Burst] Synchronization for OFDM", Proceedings of ICC 1996, vol. 3, pp. 1301-1306.

* cited by examiner

*Primary Examiner*—Young T. Tse

(57) ABSTRACT

A timing recovery scheme demarcates a complete range of inter-symbol interference free (ISI-free) sampling positions available in a cyclically extended symbol. The timing recovery scheme computes an ensemble correlation between the cyclic extension and the data part of symbols to estimate timing. The ensemble correlation function retains delay-spread and timing information by separately maintaining the correlation value for each sample position within the symbol duration and combines the correlation values for identical sample positions over an ensemble of symbols. In this manner, the scheme not only provides timing estimates, but can also provide estimates of the multipath delay-spread in a channel. The delay-spread estimates provide valuable information about the nature of the channel. A receiver can use this information, for example, to adjust the frequency-domain channel interpolation filter bandwidth in order to improve performance for the given channel condition.

32 Claims, 6 Drawing Sheets

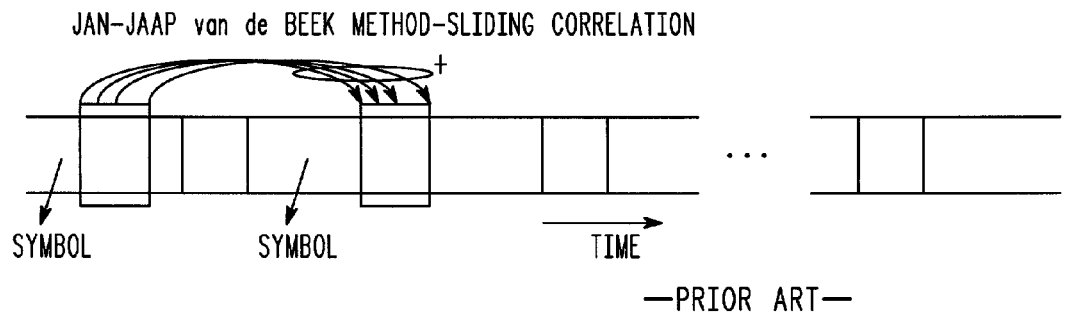
FIG. 1 —PRIOR ART—
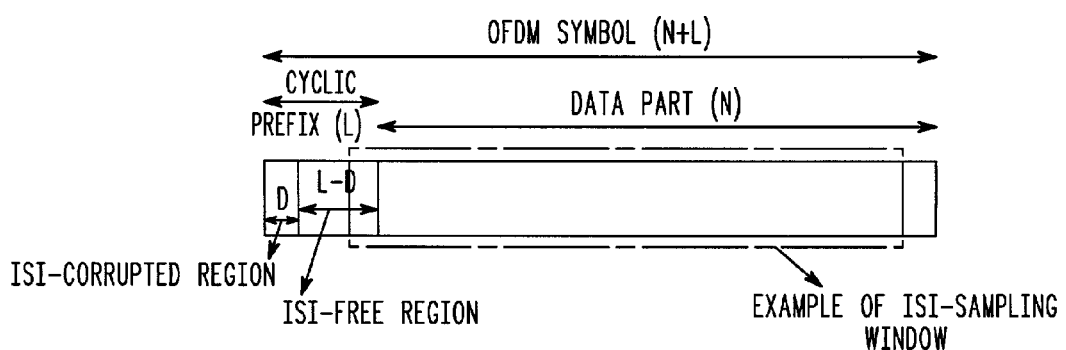
FIG. 2
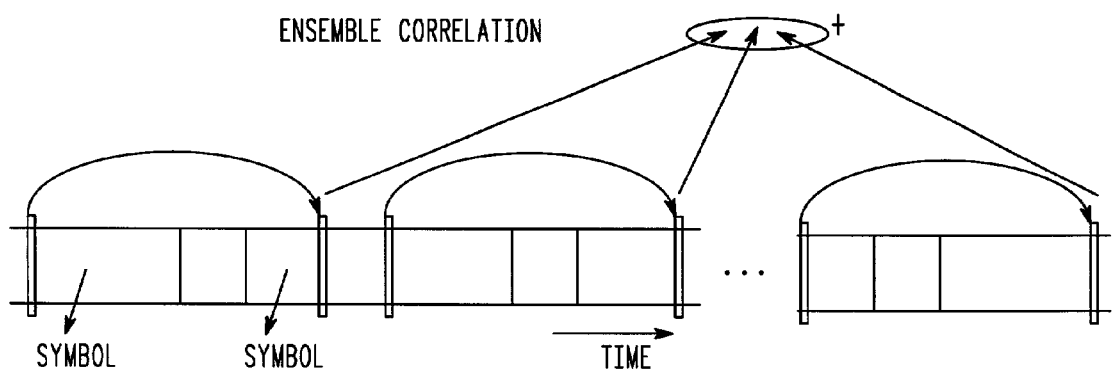
FIG. 3

METHOD AND SYSTEM FOR TIMING RECOVERY AND DELAY SPREAD ESTIMATION IN A COMMUNICATION SYSTEM

This application claims the benefit of U.S. Provisional Application No. 60/414,527, filed Dec. 29, 2000.

TECHNICAL FIELD OF THE INVENTION

The present invention relates generally to communication systems, and in particular, to a timing recovery and delay-spread estimation scheme for communication systems that employ cyclically extended symbols.

BACKGROUND OF THE INVENTION

Timing recovery in communication systems is related to the process of identifying symbol boundaries in a received signal, so that each symbol can be windowed and processed separately so that its value can be determined. In some communication systems such as OFDM (other examples include IFDMA, Single Carrier with cyclic extension), a guard interval is inserted between successive symbols to overcome inter-symbol interference (ISI) caused by multi-path delay-spread in the communication channel. Usually each symbol is cyclically extended with a prefix and/or a postfix to cover the guard interval. The cyclic extension absorbs the delay-spread and thus keeps the data portion of the symbol free of ISI. When the channel delay-spread is less than the duration of the cyclic extension, only a portion of the cyclic extension is corrupted while the rest remains ISI-free. This creates ambiguity in the timing recovery process because there is more than one possible position of the sampling-window for obtaining an ISI-free representation of the symbol.

Although known methods for timing recovery in OFDM systems are adequate and beneficial in many situations, they present several shortcomings. In a method proposed by Jan-Jaap van de Beek et al., "ML Estimation of Time and Frequency Offset In OFDM Systems", IEEE Transactions on Signal Processing, vol. 45, no. 7, July 1997 (hereinafter "Jan-Jaap van de Beek"), the cyclic extension is used to identify the best sampling position. FIG. 1 is a conceptual illustration of the Jan-Jaap van de Beek method of timing recovery. As shown, the method combines consecutive correlation values together or the length of the cyclic extension.

Unfortunately, this method is optimized and well suited for a single-ray channel. As a consequence, in a multipath-fading channel, the sampling position picked by this method may not be free of ISI and it can waver depending on which of the multipath rays is the strongest at a particular time. In a multipath-fading channel, these shortcomings detract from one of the purposes behind OFDM, which is to reduce the effects of multipath fading.

In another method proposed by T. M. Schmidl et al., "Low-Overhead, Low-Complexity [Burst] Synchronization for OFDM", Proceedings of ICC 1996, vol. 3, pp. 1301-1306 (hereinafter "Schmidl"), a special training symbol is used to estimate a sampling position. A disadvantage of this method is that the sampling position picked by this method can jump about within a set of valid positions, leading to jitter in the timing estimates. The jitter makes it difficult to use averaging, e.g., a phase locked loop (PLL), to obtain a steady sampling position. Another disadvantage with this method is that the timing estimate is based on the training symbol alone and there is no averaging over the fading process. This creates problems in a fast fading scenario where the instantaneous delay profile at the training symbol could be significantly different from the actual channel power delay profile.

Further, the above mentioned methods are not necessarily intended to provide an estimate of the delay-spread in the channel.

Accordingly, there is a need for an improved method of timing recovery and delay-spread estimation in communication systems employing cyclic extensions.

BRIEF DESCRIPTION OF THE DRAWINGS

FIG. 1 is a conceptual illustration of a prior art method of timing recovery.

FIG. 2 illustrates an exemplary OFDM symbol.

FIG. 3 is a conceptual illustration of an ensemble correlation of the present invention.

DETAILED DESCRIPTION OF THE PRESENTLY PREFERRED EMBODIMENT(S)

Figure 4:
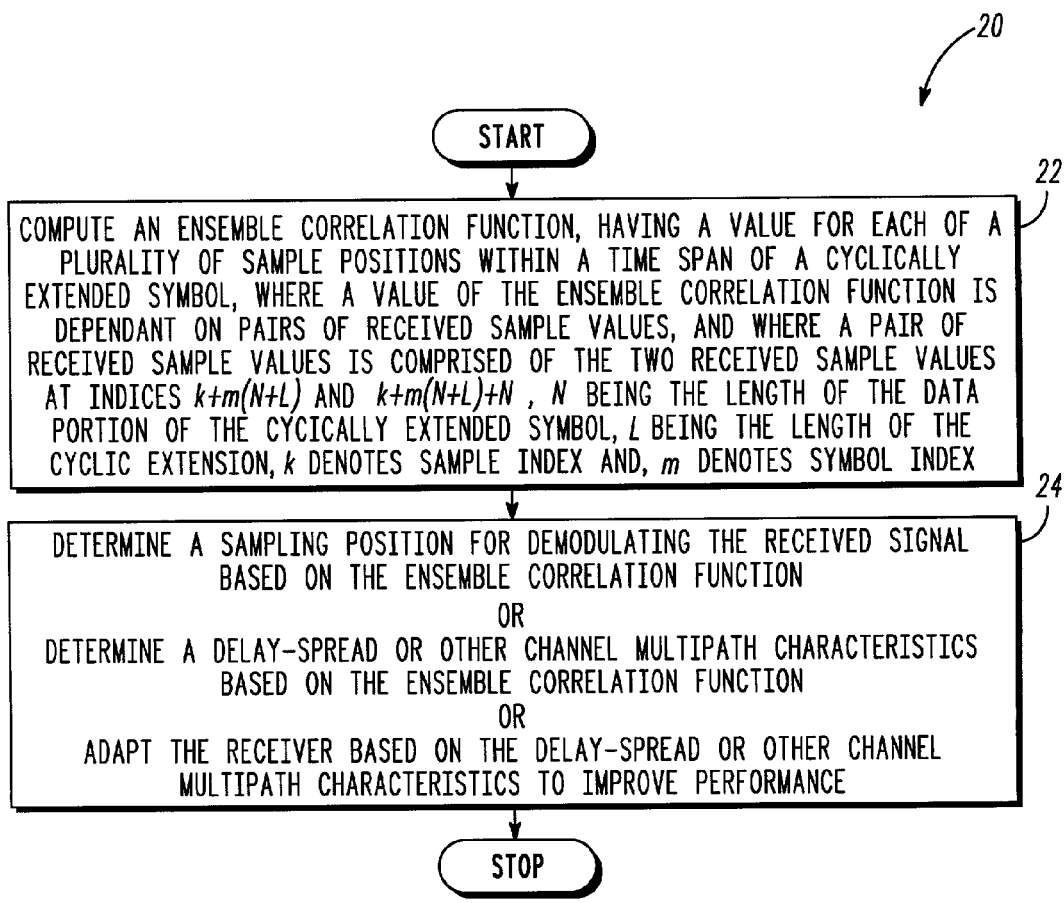
FIG. 4 is a flowchart illustrating a method of using an ensemble correlation function in a communication system in accordance with an embodiment of the present invention.

According to one aspect of the present invention, a timing recovery scheme is provided that demarcates a complete range of ISI-free sampling positions available in an OFDM symbol. Also provided is a method for estimating the multipath delay-spread in the channel, or other multipath channel characteristics. An estimate of one or more multipath channel characteristics, such as delay-spread for example, provides a receiver valuable information about the nature of the channel. The receiver can use this information to adapt the receiver, for example, to adjust the frequency-domain channel interpolation filter bandwidth in order to improve performance for the given channel condition.

FIG. 2 shows an exemplary OFDM symbol with cyclic prefix partly corrupted by ISI and the range of ISI-free sampling-window positions available for that symbol. As shown, the length of the OFDM symbol is represented by N+L, where the data part length is N and the cyclic prefix length is L; the length of the ISI-corrupted region of the cyclic prefix is represented by D and the ISI-free region of the prefix is L−D.

The invention uses the correlation between the cyclic extension and the data part of the OFDM symbol to estimate the timing. However, it has key differences from known techniques in the way the correlation is computed and used to estimate timing. For example, according to one aspect of the invention, an "ensemble correlation function" is used to provide improved delay-spread and timing information by not combining together consecutive correlation values over the entire length of the cyclic extension. The ensemble correlation function is obtained by combining consecutive correlation values over a window smaller than the length of the cyclic extension, and by combining correlation values for identical sample positions over an ensemble of OFDM symbols. FIG. 3 is a conceptual illustration of an ensemble correlation of the present invention.

In one embodiment, if r denotes the received signal sequence, the ensemble correlation function has a component of the form:

$$\left| \sum_{m=0}^{M-1} \sum_{j=0}^{J-1} r^*(k+j+m(N+L))r(k+j+m(N+L)+N) \right| \quad (1)$$

where N is the fast Fourier transform (FFT) size, L is the length of the cyclic extension, where J, M, N, L, and k are integers and the superscript * denotes conjugation operation. The inner sum in the above expression corresponds to combining consecutive correlation values over a window of length J, where in one embodiment J is an integer much smaller than the length of the cyclic extension, and the outer sum corresponds to combining correlation values for identical sample positions over an ensemble of M symbols, where M is another integer. Identical sample positions in successive OFDM symbols are separated by N+L samples and accordingly the outer sum combines correlation values spaced by N+L positions.

Using the ensemble correlation function, an improved method for estimating the symbol timing from the received OFDM signal is provided. By making the correlation window small compared to the length of the cyclic extension, each portion of the OFDM symbol can be inspected separately and information can be obtained about what portion of the cyclic extension is corrupted due to channel delay-spread. This makes it possible to estimate the delay-spread and also to identify and demarcate a range of ISI-free sampling positions available. Consequently, the method can provide a steady, jitter-free estimate of the symbol timing for a variety of channel conditions. In addition, the method can average the correlation function over a large number of symbols to provide robustness to fast fading, i.e., to limit the impact of instantaneous fades on performance.

In a preferred embodiment, the ensemble correlation function is computed with the correlation window only one sample wide, i.e., with J=1. This means that consecutive correlation values are not combined together and the correlation computation involves only the outer sum combining correlation values over the ensemble of symbols. The normalized form of the ensemble correlation function is used and it can be expressed in equation form as follows:

$$\rho(k) = \frac{\left| \sum_{m=0}^{M-1} r^*(k+m(N+L))r(k+m(N+L)+N) \right|}{\sqrt{\sum_{m=0}^{M-1} |r(k+m(N+L))|^2} \sqrt{\sum_{m=0}^{M-1} |r(k+m(N+L)+N)|^2}} \quad 0 \le k < N+L \quad (2)$$

Other forms of the ensemble correlation function are possible without departing from the underlying principle of ensemble correlation, such as using only the numerator of Eq. (2), or using the numerator of Eq. (2) divided by some other indicator of signal level as the denominator, or using $\rho^2(k)$ instead of $\rho(k)$ as the ensemble correlation function. In another embodiment, the ensemble correlation function can be computed as $$\rho(k) = \left| \sum_{m=0}^{M-1} r^*(k+m(N+L))r(k+m(N+L)+N) \right| - \quad (3)$$

$$\frac{1}{2}\left( \sum_{m=0}^{M-1} |r(k+m(N+L))|^2 + \sum_{m=0}^{M-1} |r(k+m(N+L)+N)|^2 \right)$$

Further, Eqs. (2) and (3) use straight summation over a block of M samples. This can be modified to include a windowing effect, such as an exponential window. Also, the block summations in Eq. (2) can be implemented as recursive summations. Moreover, in cases where the carrier frequency offset of the input signal is negligible, it is possible to use the real part instead of the magnitude in the ensemble correlation computation.

Since the ensemble correlation function can compute the correlation coefficient separately for each sample position in the OFDM symbol duration, it gives information about what portion of the cyclic extension is corrupted due to channel delay-spread. This makes it possible to estimate the delay-spread and also to identify and demarcate a range of ISI-free sampling positions available. In a single-ray channel, where there is no delay-spread, the ensemble correlation function has a plateau of width L, indicating that every sample of the cyclic extension matches the corresponding sample of the data portion of the symbol. In a multipath channel, the width of the plateau reduces depending on the extent of delay-spread D in the channel.

FIG. 4 is a flowchart 20 illustrating a method of using an ensemble correlation function in a communication system in accordance with an embodiment of the present invention. As described in the step 22, an ensemble correlation function computed using plural sample values from a received signal. The function can be computed according to Eq. (2). Next, in step 24, the ensemble correlation function is used to perform one or more functions relating to the received information symbols. For example, a sampling position can be determined for demodulating the received signal based on the function; or a channel impulse response duration, i.e., delay-spread can be computed; or other multipath channel characteristics such as the multipath intensity or power delay profile can be determined. Also, the receiver can be adapted based on the delay-spread or other channel characteristics to improve performance. One example of adapting the receiver is to modify the processing used to detect the received information signal to improve performance.

Figure 5:
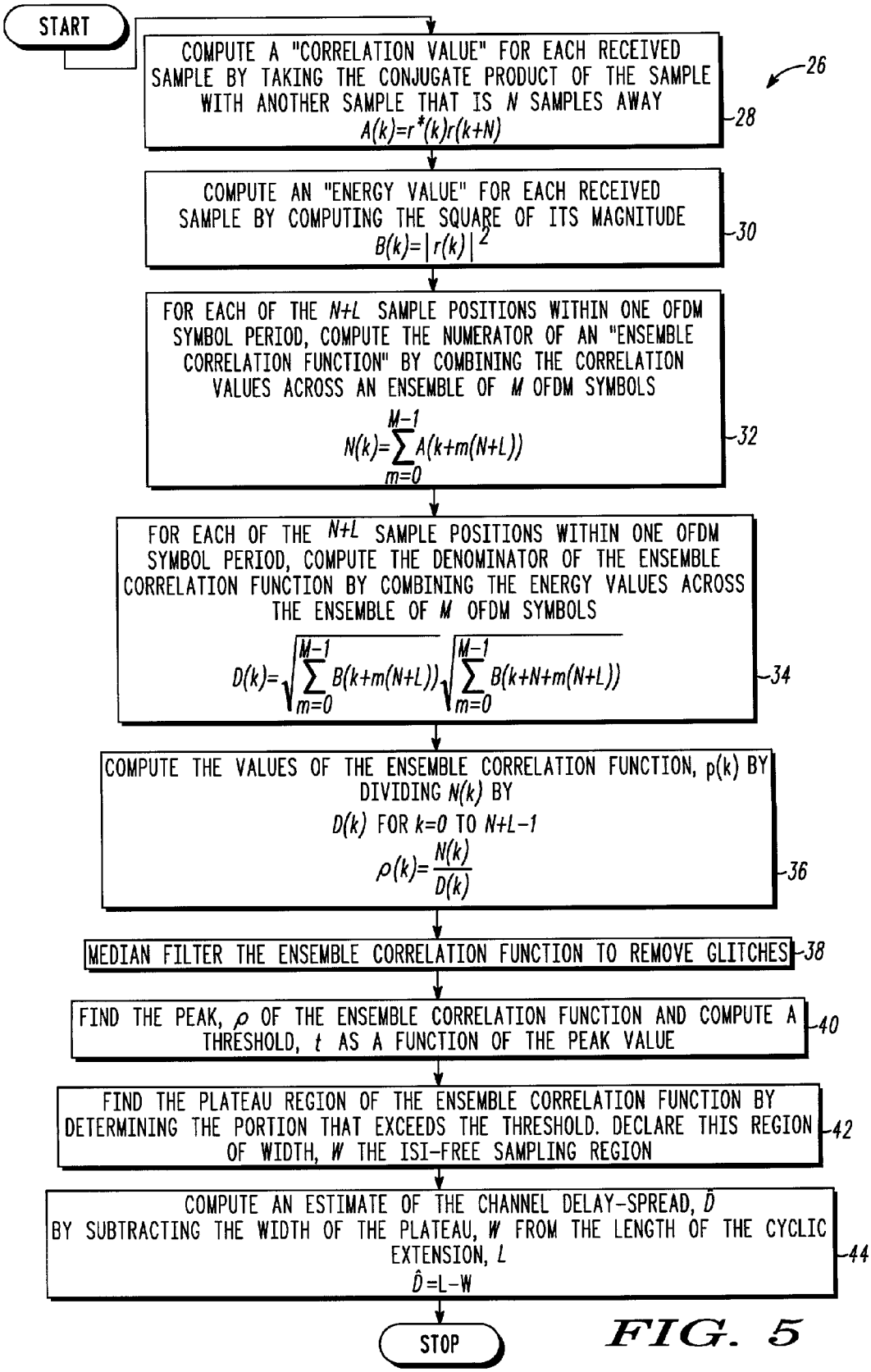
FIG. 5 is a flowchart illustrating a method of performing timing and channel delay-spread estimation in accordance with another embodiment of the invention.

FIG. 5 is a flowchart 26 illustrating an exemplary method of performing timing and channel delay-spread estimation in an OFDM system, in accordance with another embodiment of the invention. The method uses the ensemble correlation function of Eq. (2) to perform the estimation. In step 28, a correlation value is computed for each received sample. In step 30, an energy value is computed. Next, in step 32, the numerator of the ensemble correlation function of Eq. (2) is computed by combining the correlation values across the ensemble of symbols. In step 34, the denominator of Eq. (2) is computed by combining the energy values across the ensemble of symbols. In step 36, the ensemble correlation function produced by Eq. (2) is computed.

In step 38, the output of the ensemble correlation function is post-processed as follows. First, a 3-tap or 5-tap median filter can be used to remove any sharp glitches in the correlation function, while still retaining the distinct nature of the plateau and its sharp edges.

Next, in step 40, the peak value, p of the ensemble correlation function is found and a threshold value, t can be determined as a function of the peak as $t=p-\alpha(1-p)$, where $\alpha>0$ is a design parameter.

In step 42, the first and last points where the correlation function crosses the threshold are determined and a plateau region in between these two points is declared the ISI-free sampling region. A point chosen from within this region can be declared as the estimated sampling position. In step 44, the width of this region W is subtracted from the total length of the cyclic extension to obtain an estimate of the channel delay-spread.

$$\hat{D}=L-W \quad (4)$$

In another embodiment, the width of the region W can be determined using steps that are different from steps 38, 40, 42 and 44. For example, the slope of the ensemble correlation function can be used to detect the edges and width of the plateau. Also, the types or sizes of filters used to filter the ensemble correlation function can be changed, or other thresholds can be used than the one mentioned in step 40.

In the initial acquisition stage, the plateau may be split between the two ends of the ensemble correlation function. In other words, the plateau starts at a point close to k=N+L, and wraps back around to k=0. One way to alleviate this wrap-around is to circularly shift the correlation function such that the peak value p is positioned at the center, i.e., at k=(N+L)/2. This ensures that the plateau lies approximately at the center of the correlation function. An equivalent adjustment can also be made to the timing estimate as well.

In a tracking mode, the ensemble correlation function is computed and processed as above for every group of M OFDM symbols received. In one embodiment, the estimated start and end points of the plateau can be tracked using two phase locked loops (PLLs). This yields a steady estimate of the delay spread and the ISI-free sampling region.

Figure 6:
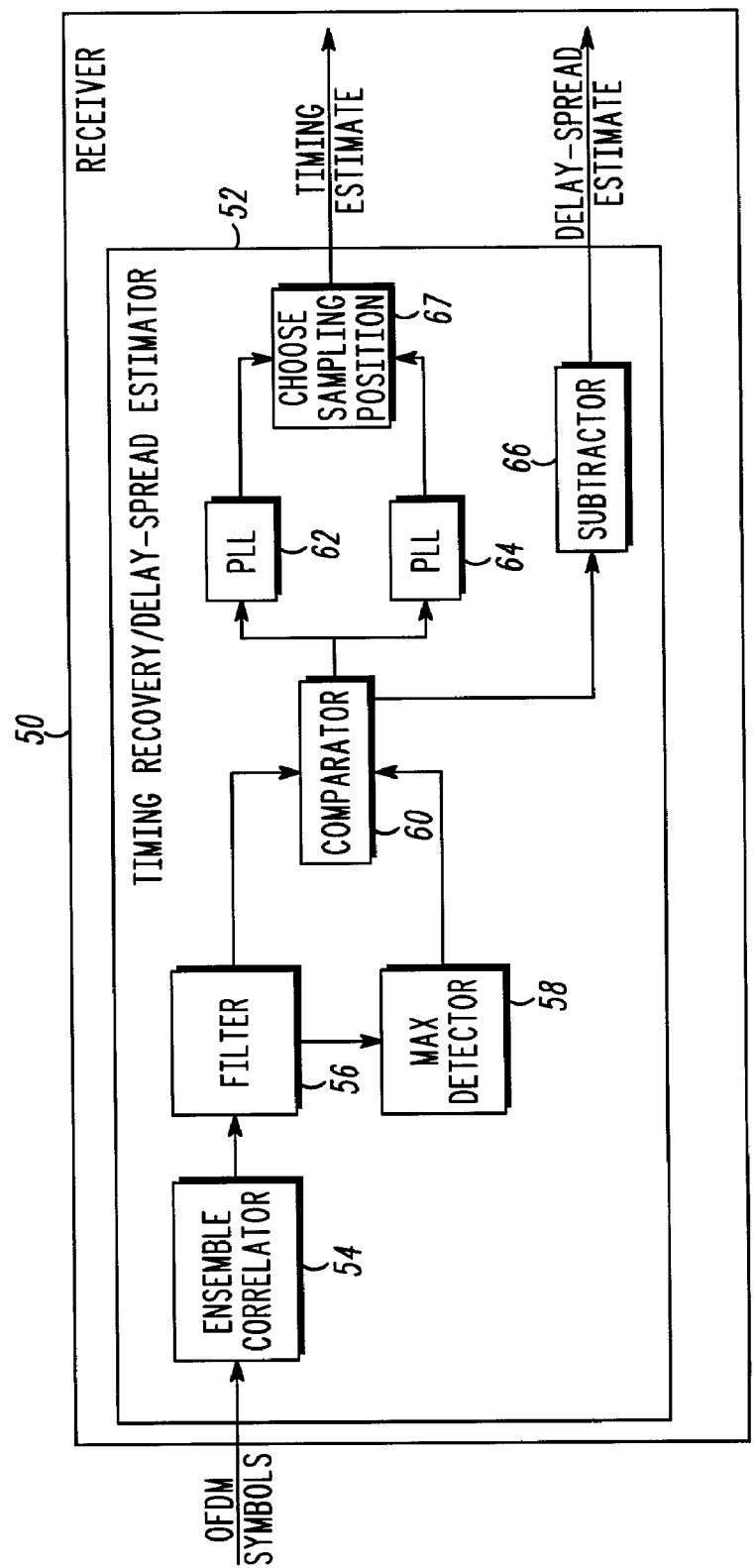
FIG. 6 is a block diagram of an exemplary receiver in accordance with a further embodiment of the invention.

FIG. 6 is a block diagram of an exemplary receiver 50 in accordance with another embodiment of the invention. The receiver 50 can be included in a communication system, such as a cellular and/or paging system, using an OFDM scheme or the like. The receiver 50 includes a timing recovery/delay-spread estimator 52, that includes an ensemble correlator 54, a filter 56, a peak (max) detector 58, a comparator 60, a pair of PLLs 62–64, a sampling position selector 67, and a subtractor 66.

The ensemble correlator 54 receives digital samples representing OFDM symbols and computes the ensemble correlation function in accordance with Eq. (2). The output of the correlator 54 is filtered by the filter 56, which can be any suitable digital filter, including the either of the median filters discussed above in connection with FIG. 5. The peak detector 58 determines the peak value and provides as output to the comparator the threshold value described above in connection with FIG. 5.

The comparator 60 compares the filtered outputs of the ensemble correlation function to the threshold value to determine crossing points. The PLLs 62–64 can be any suitable PLL, digital or analog, for tracking the threshold crossings.

The subtractor 66 outputs the delay-spread estimation by subtracting the width of the sampling region from the length of the cyclic extension of the OFDM symbol.

The architecture of the timing recovery/delay-spread estimator (TRDSE) 52 is shown as an example. The structure of the TRDSE 52 can include any suitable combination of hardware and/or software components for performing the functions of the components 54–66 described herein.

Figure 7:
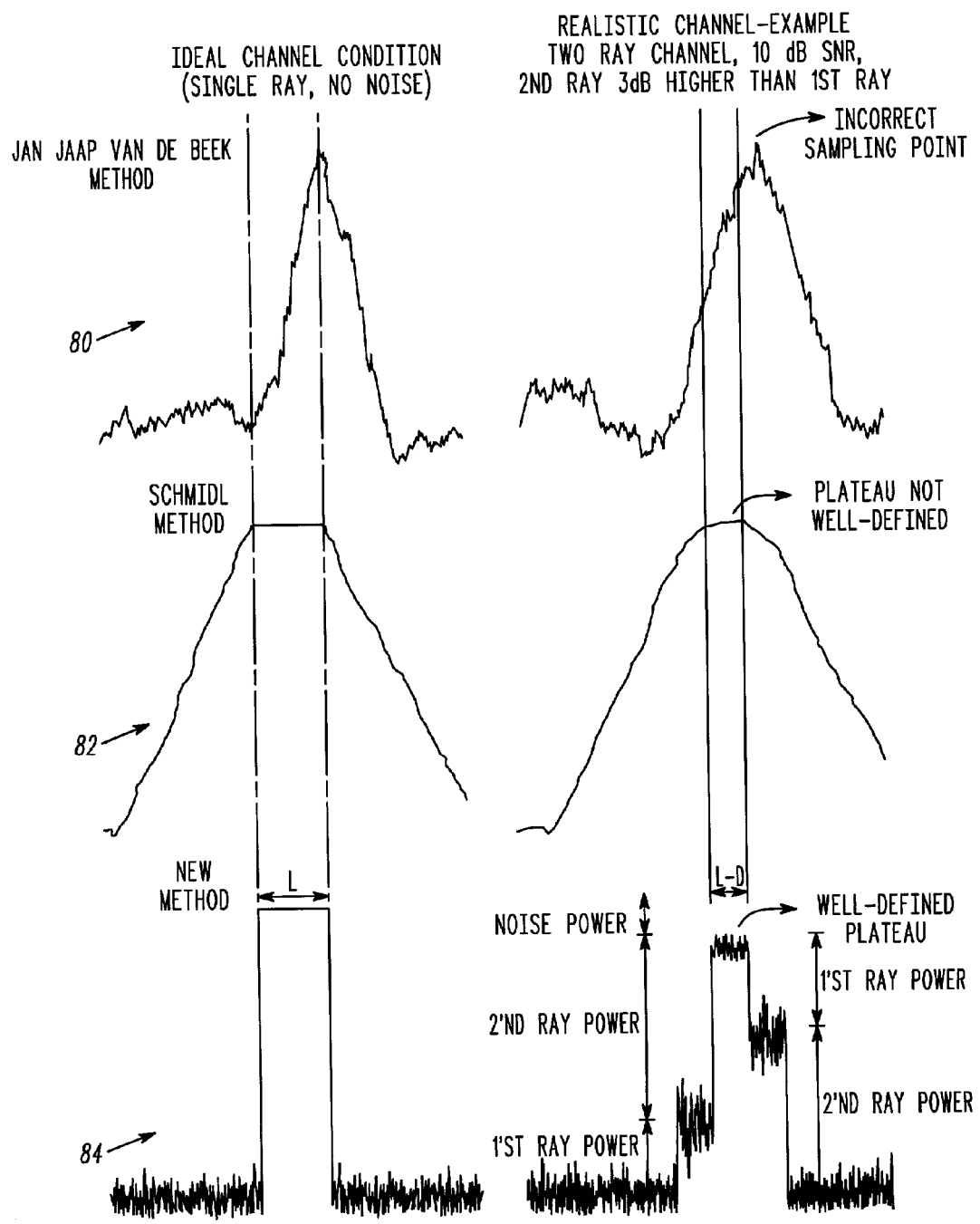
FIG. 7 is a set of graphs showing an exemplary comparison between the ensemble correlation function of the present invention and the correlation functions of two known methods of timing recovery for OFDM.

FIG. 7 shows a plot 84 of the ensemble correlation function used by the present invention and compares it to the correlation functions used by the known methods presented by Jan-Jaap van de Beek 80 and Schmidl 82. Two different channel conditions are shown in the columns of the plot —one where the channel is ideal with no delay-spread (left column) and another where the channel is noisy and has some delay-spread (right column). The number of OFDM symbols used in computing the ensemble correlation function shown was M=200. It can be observed from FIG. 7 that the method of Jan-Jaap van de Beek provides a single peak and does not give any delay-spread information. This peak does not always occur at an ISI-free sampling position. The method of Schmidl provides a plateau, but this plateau is not "well-marked" and is therefore difficult to identify and demarcate.

In contrast, the method of the present invention provides a distinct plateau, which clearly demarcates a range of ISI-free sampling positions available. Thus, the timing information extracted by the present invention is superior compared to the previous methods.

Figure 8:
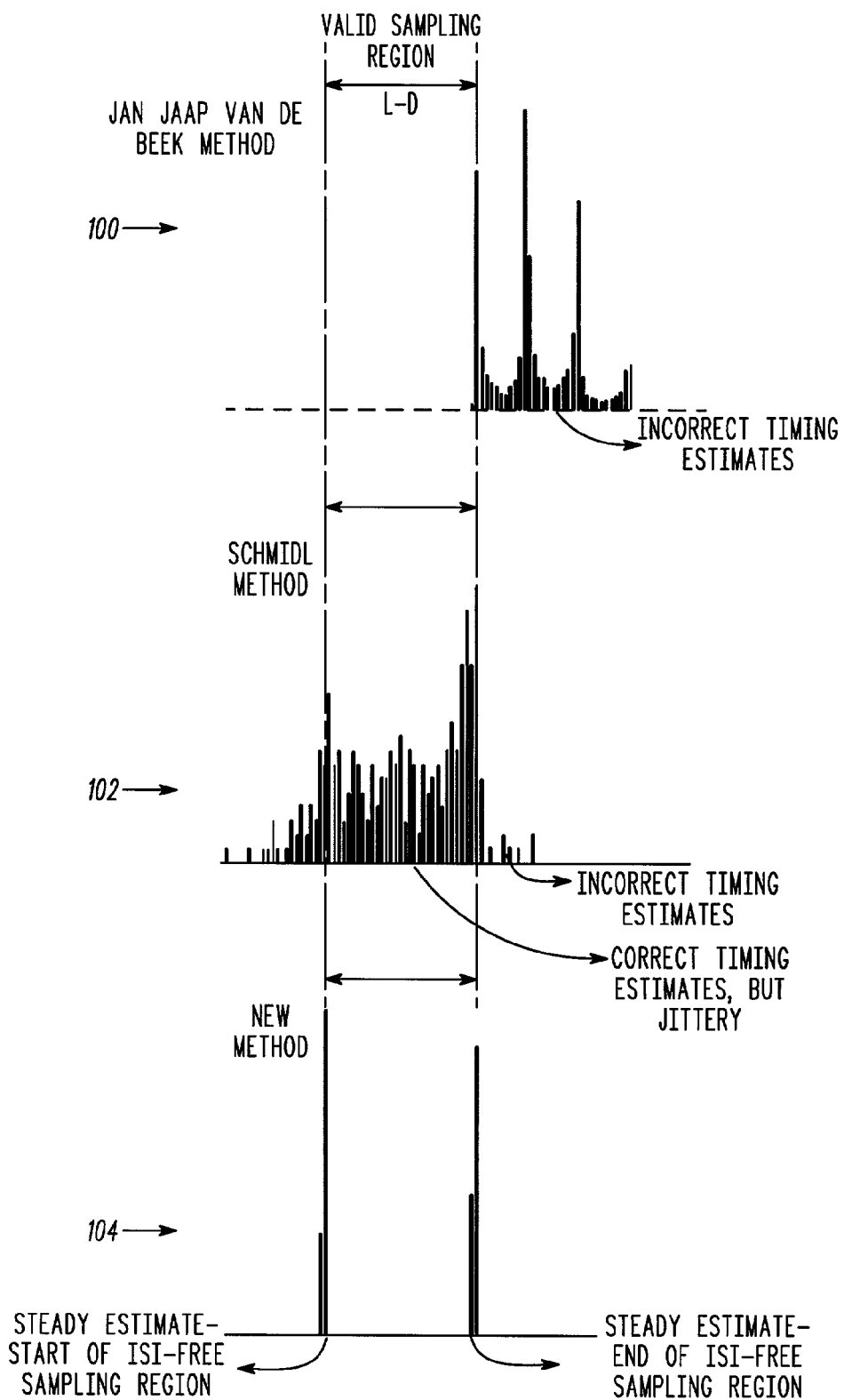
FIG. 8 is a set of histograms showing an exemplary comparison between the timing recovery method of present invention and two known methods of timing recovery for OFDM.

FIG. 8 shows a histogram 104 of the timing estimate generated by the method of the present invention as compared with the known methods of Jan-Jaap van de Beek 100 and Schmidl 102. The parameters used to generate the histogram were N=1024, L=256, M=200, $\alpha=0.35$. The OFDM symbol rate was 20 kHz. The channel was a 4-ray channel with a delay span equal to one-half the length of the cyclic extension. An exponentially decaying power delay profile was used with the last ray having a power 3 dB below the first ray. Each ray was faded at a Doppler frequency of 300 Hz, which corresponds to a vehicle speed of 58 mph at a carrier frequency of 3.5 GHz. The signal-to-noise ratio (SNR) was 10 dB.

It can be observed from the histogram plots 100–102 that the Jan-Jaap van de Beek method can frequently pick sampling positions outside the valid sampling region. Thus, the timing estimate from this method may not be free of ISI.

The Schmidl method picks sampling positions within the valid sampling region most of the time, but these estimates jump around within the valid sampling region leading to jitter in the timing estimate.

In contrast, the method of the present invention provides an accurate estimate of the start and end of the valid sampling region. Any particular point within this region can then be fixed as the estimated sampling position. This method can be much more reliable than previous methods in the sense that the timing estimate is ISI-free for a variety of channel conditions.

Furthermore, since this method provides an estimate of the entire valid sampling region, it is possible to sample the signal using more than one sampling window and combine the outputs appropriately to improve performance. Also, the delay-spread information provided by this method can be used to adjust the frequency-domain channel interpolation filter bandwidth to provide optimum performance. These techniques, which can be part of another embodiment as described next, can yield up to 1 dB improvement in performance.

Another embodiment of the invention determines a multipath channel characteristic based on an ensemble correlation function and adapts the receiver 50 based on the multipath channel characteristic. FIG. 7 illustrates that several multipath channel characteristics can be determined. For example, the total height of the plateau is proportional to the total signal power and the height of each individual step that leads to the plateau is proportional to the power of a corresponding multipath ray. The distance between steps can be used to determine the time separation between multipath rays, and Eq. (4) describes how to determine the multipath channel delay spread. So the ensemble correlation may be used to determine the delay-spread, the number of significant multipath rays, the relative strengths or powers of the multipath rays, the time delays between the multipath rays, or other characteristics related to the channel impulse response or the channel power-delay profile.

Adapting the receiver 50 based on a multipath channel characteristic is preferably done in the digital baseband portion of the receiver because it is typically much simpler to adapt or modify digital signal processing and digital signal detection methods rather than analog receiver components.

In one example, adapting the receiver 50 based on a multipath channel characteristic comprises determining the coefficients of a filter used to interpolate and/or smooth complex channel gain estimates for the subcarriers of an OFDM signal. This filter is a channel estimation filter. When an OFDM signal includes known or pilot symbols on certain subcarriers, the receiver compares a received pilot symbol to the known transmitted pilot symbol value to measure the complex channel gain on the subcarrier containing the pilot symbol. This process is repeated on each subcarrier having a pilot symbol to obtain a set of measurements. However, these measurements are sometimes too noisy to be used directly, so filtering can be used to reduce the noise (smoothing) and interpolate values of the complex channel gain between the subcarriers containing pilot symbols. As the delay spread becomes smaller, the complex channel gain becomes more correlated between subcarriers and the channel estimation filter can perform more smoothing to further reduce the impact of noise.

On the other hand, as the delay spread becomes larger, the complex channel gain becomes less correlated between subcarriers, and the channel estimation filter may reduce the amount of smoothing in order to follow the faster variation in the channel gain. Thus, as the delay spread becomes smaller, the bandwidth of the channel estimation filter can be reduced, and as the delay spread becomes larger, the channel estimation filter bandwidth can be increased (the bandwidth of the filter is related to the Fourier transform of the filter coefficients).

In one embodiment, a plurality of channel estimation filters with different bandwidths is stored in the receiver 50, and the step of determining the coefficients of the filter comprises selecting the coefficients of one of the filters based on the delay-spread.

In an additional example, adapting the receiver 50 based on a multipath channel characteristic comprises identifying an ISI-free portion of a cyclic extension in a received OFDM symbol, and combining the ISI-free portion of the cyclic extension with the corresponding data portion of the received OFDM symbol. Both the ISI free portion and corresponding data portion are preferably multiplied by 0.5 prior to combining, in order to preserve the orthogonality of the OFDM subcarriers.

Additional examples of adapting the receiver based on a multipath channel characteristic include adapting the bandwidth of the PLLs used in the tracking mode of the embodiment portrayed in FIG. 6, or adapting the bandwidth of the filter used in the embodiments portrayed in FIGS. 5 and 6.

It is anticipated that adapting the receiver 50 based on a multipath channel characteristic can also be advantageously applied to other portions, methods, and algorithms of a receiver besides the previous examples.

Although the description of the inventions as disclosed herein relates primarily to embodiments in OFDM systems, the invention can be used in many different types of communication systems employing cyclic extension.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A method for timing recovery in a communication system using cyclic extension of a plurality of symbols, the method comprising:
   computing ensemble correlation function output from the plurality of symbols;
   determining a valid sampling region based on a width of a plateau of the ensemble correlation function output; and
   determining at least one sampling position for at least one symbol based on the valid sampling region.

2. The method of claim 1, further comprising defining the valid sampling region based on a comparison of the ensemble correlation function output to a threshold.

3. The method of claim 1, further comprising:
   filtering the ensemble correlation function output.

4. The method of claim 3 wherein the filtering occurs prior to determining the valid sampling region 5. The method of claim 3, further comprising:
   using a median filter to filter the ensemble correlation function output.

6. The method of claim 1, further comprising:
   determining a peak value included in the ensemble correlation function output.

7. The method of claim 6, further comprising:
   determining a threshold as a function of the peak value.

8. An apparatus comprising:
   a correlator for computing an ensemble correlation function from a plurality of received symbols;
   a comparator, operatively coupled to the correlator, for determining a valid sampling region based on a width of a plateau of the ensemble correlation function; and
   a sampling position selector, operatively coupled to the correlator, for determining at least one sampling position for at least one symbol based on the valid sampling region.

9. The apparatus of claim 8, further comprising:
   a filter, operatively coupled to the correlator, for filtering the ensemble correlation function.

10. The apparatus of claim 9, further comprising:
a maximum detector, operatively coupled to the filter, for determining a peak value included in the filtered ensemble correlation function.

11. The apparatus of claim 8, further comprising:
a subtracter operatively coupling the comparater, for subtracting a width of length of a cyclic extention of a symbol to obtain an estimate of a delay-spread.

12. The apparatus claim 8, for use in a receiver.

13. The apparatus of claim 12, wherein the receiver is wireless.

14. The apparatus of claim 8, further comprising:
at least one phase locked loop for tracking edges of the plateau.

15. A method for estimating delay-spread in a communication system using cyclic extension of a plurality of symbols, the method comprising:
computing an ensemble correlation function from the plurality of symbols; and
using the ensemble correlation function to estimate the delay-spread.

16. The method of claim 15, further comprising:
comparing the ensemble correlation function to a threshold to define a valid sampling region; and
subtracting a width of the valid sampling region from a length of the cyclic extension of a symbol to obtain the estimate of the delay-spread.

17. The method of claim 16, wherein threshold crossing points of the ensemble correlating function define the valid sampling region.

18. The method of claim 15, further comprising:
filtering the ensemble correlation function.

19. The method of claim 18, further comprising:
using a median filter to filter the ensemble correlation function.

20. The method of claim 15, further comprising:
determining a peak value included in the ensemble correlation function.

21. The method of claim 20, further comprising:
determining a threshold as a function of the peak value.

22. An apparatus for estimating delay-spread in a communication system using cyclic extension, comprising:
a correlator for computing an ensemble correlation function from a plurality of symbols; and
a delay-spread estimator, operatively coupled to the correlator, for estimating the delay-spread.

23. The apparatus of claim 22, wherein the delay-spread estimator includes:
a comparator, operatively coupled to the correlator, for comparing the ensemble correlation function to a threshold to define a valid sampling region; and
a subtractor, operatively coupled to the comparator, for subtracting a width of the valid sampling region from a length of the cyclic extension of a symbol to obtain the estimate of the delay-spread.

24. The apparatus of claim 22, further comprising:
a filter, operatively coupled to the correlator, for filtering the ensemble correlation function.

25. The apparatus of claim 24, further comprising:
a maximum detector, operatively coupled to the filter, for determining a peak value included in the filtered ensemble correlation function.

26. The apparatus of claim 22, for use in a receiver.

27. The apparatus of claim 26, wherein the receiver is wireless.

28. A method for adapting a receiver in a communication system using cyclic extension of a plurality of symbols, the method comprising:
computing an ensemble correlation function from the plurality of symbols;
determining a multipath channel characteristic based on the ensemble correlation function; and
adapting the receiver based on the multipath channel characteristic.

29. The method of claim 28, wherein the multipath channel characteristic is delay-spread.

30. The method of claim 28, wherein the step of adapting comprises:
determining one or more coefficients of a channel estimation filter in the receiver.

31. The method of claim 28, wherein the step of adapting comprises:
identifying an inter-symbol-interference free portion of the cyclic extension of a received symbol.

32. The method of claim 28 wherein the step of adapting comprises:
determining at least one sampling position for at least one symbol based on the multipath channel characteristic.

* * * * *